US011236859B2

(12) United States Patent
Schmid

(10) Patent No.: US 11,236,859 B2
(45) Date of Patent: Feb. 1, 2022

(54) APPARATUS FOR MOVABLE FASTENING OF A LABORATORY UNIT

(71) Applicant: WALDNER Laboreinrichtungen GmbH & Co. KG, Wangen im Allgäu (DE)

(72) Inventor: Matthias Schmid, Wangen im Allgäu (DE)

(73) Assignee: WALDNER Laboreinrichtungen GmbH & Co. KG, Wangen im Allgäu (DE)

( * ) Notice: Subject to any disclaimer, the term of this patent is extended or adjusted under 35 U.S.C. 154(b) by 0 days.

(21) Appl. No.: 17/062,207

(22) Filed: Oct. 2, 2020

(65) Prior Publication Data
US 2021/0102662 A1 Apr. 8, 2021

(30) Foreign Application Priority Data

Oct. 4, 2019 (DE) ...................... 10 2019 126 771.4

(51) Int. Cl.
*F16M 13/02* (2006.01)
(52) U.S. Cl.
CPC ........ *F16M 13/022* (2013.01); *F16M 13/027* (2013.01)
(58) Field of Classification Search
CPC combination set(s) only.
See application file for complete search history.

(56) References Cited

U.S. PATENT DOCUMENTS

| 3,778,537 | A | * | 12/1973 | Miller | H01Q 1/1228 |
| | | | | | 174/138 R |
| 4,662,590 | A | * | 5/1987 | Hungerford, Jr. | F16L 3/2431 |
| | | | | | 248/72 |
| 5,018,681 | A | * | 5/1991 | Weimar | D01H 1/183 |
| | | | | | 211/162 |
| 5,133,523 | A | * | 7/1992 | Daigle | F16L 3/1075 |
| | | | | | 248/62 |
| 5,322,253 | A | * | 6/1994 | Stevens | F16M 13/022 |
| | | | | | 248/125.1 |
| 5,375,798 | A | * | 12/1994 | Hungerford, Jr. | F16L 3/243 |
| | | | | | 248/58 |
| 6,447,200 | B1 | * | 9/2002 | Hungerford, III | F16B 37/045 |
| | | | | | 248/72 |

(Continued)

FOREIGN PATENT DOCUMENTS

DE 4033739 A1 4/1992

*Primary Examiner* — Monica E Millner
(74) *Attorney, Agent, or Firm* — Dorton & Willis, LLP

(57) ABSTRACT

An apparatus for movable fastening of a laboratory unit to a horizontally extending, elongated ceiling beam which is mounted in the region of a room ceiling and has at least one first groove which extends in the lengthwise direction of the ceiling beam. The apparatus includes: (i) a sliding element engageable with the first groove of the ceiling beam such that the apparatus is movable in lengthwise direction of the first groove, wherein a height of the sliding element is substantially equal to a height of an access opening to the groove, (ii) a retaining element for detachably fastening the laboratory unit, and (iii) at least one locking element which can be connected to the ceiling beam such that the apparatus is prevented from moving in the lengthwise direction of the first groove.

17 Claims, 2 Drawing Sheets

(56) References Cited

U.S. PATENT DOCUMENTS

| | | | | |
|---|---|---|---|---|
| 7,708,237 B2* | 5/2010 | Mummert | .............. | F16M 11/42 |
| | | | | 248/122.1 |
| 7,913,957 B2* | 3/2011 | Nelson | .................... | F16B 21/02 |
| | | | | 248/71 |
| 9,127,807 B1* | 9/2015 | Holloway | ............ | F16M 11/041 |
| 10,227,776 B2* | 3/2019 | Mayer | .................. | E04B 9/065 |
| 10,582,981 B2* | 3/2020 | Childs | .................... | A61B 50/26 |
| 10,758,065 B2* | 9/2020 | Penalver, Jr. | ...... | A47B 96/1466 |
| 10,898,394 B2* | 1/2021 | Sirkin | ....................... | A61G 1/04 |
| 2008/0078031 A1* | 4/2008 | Weinstein | ............. | A61F 5/3707 |
| | | | | 5/630 |

* cited by examiner

APPARATUS FOR MOVABLE FASTENING OF A LABORATORY UNIT

CROSS-REFERENCE TO RELATED APPLICATIONS

This application claims the benefit of priority under 35 U.S.C. § 119(a) to German Patent Application DE 10 2019 126 771.4, filed Oct. 4, 2019 (pending), the disclosure of which is incorporated by reference in its entirety.

TECHNICAL FIELD

The present invention relates to an apparatus for movable fastening of a laboratory unit to a horizontally extending, elongated ceiling beam which is mounted in the region of a room ceiling and has at least one first groove which extends in the lengthwise direction of the ceiling beam.

BACKGROUND

The requirements modern laboratories are expected to satisfy nowadays are many and varied. For example, it is enormously important for users to be able to adapt the laboratory rapidly, and this will become increasingly significant in the future. To this end, "service ceilings" have been developed, which are designed to integrate all fluid laboratory media as well as gases, electricity, data lines, lighting, air conditioning and air supply and extraction, and whose enormous adaptability to changing conditions enable effective, versatile use of the laboratory.

The media are delivered to the respective work area via lab service columns, service booms or service wings, to name just a few examples, which are installed in particular close to the laboratory ceiling with full or partial use of the area. A service column is understood generally to describe a vertically aligned laboratory media supply installation which delivers the laboratory media supplied by the service column substantially to precisely defined points in the laboratory area below it, and is installed either on the laboratory ceiling or on the laboratory service ceiling described previously, or even on the underside of a hanging cabinet. A service boom is usually understood to refer to a laboratory media supply installation which extends horizontally and is attached to the laboratory ceiling or the service ceiling with the aid of two vertical rails. Compared with a service column, it is possible to supply laboratory media over a larger linear range of the laboratory with the service boom. The lab media ports for both the service column and the service boom are positioned at chest or head level of an adult of normal height. In contrast, a service wing extends horizontally over a considerably larger area of the laboratory, above head height of an adult of normal height. The service wing may be fastened to both the laboratory ceiling and the service ceiling.

The fastening of such laboratory media supply installations or other suspended lab structures, referred to generally in the following as laboratory units with standard commercially available connecting elements, such as mounting rods and screws, is extremely labour-intensive and most often cannot be carried out without the aid of trained technicians. If it is also intended that they be displaceable, additional tools must be supplied. A lifting apparatus is also needed as an installation aid, because the installation requires the use of tools. Furthermore, there is no drop protection. This must also be added in a second work step in order to prevent the installation from falling during subsequent use.

SUMMARY

Accordingly, one object of the present invention is to minimise and possibly even eliminate the drawbacks associated with the related art. In particular, it is an object of the present invention to provide an apparatus and a system which enable the laboratory media supply installations described earlier to be installed without tools on a support present in the region of the laboratory ceiling, without additional drop protection.

This object is solved with an apparatus in accordance with the principles of the present disclosure.

According to a first aspect of the invention an apparatus is provided for the movable fastening of a laboratory unit to a horizontally extending, elongated ceiling beam which is mounted in the region of a room ceiling and has at least one first groove which extends in the lengthwise direction of the ceiling beam. The apparatus according to the invention comprises (i) a sliding element which can carry the weight of the laboratory unit and is engageable with the first groove of the ceiling beam, in such manner that the apparatus is movable in the lengthwise direction of the first groove in the ceiling beam, wherein a height of the sliding element is substantially equal to a height of an access opening to the groove, (ii) a retaining element for detachably fastening the laboratory unit, and (iii) at least one locking element which can be connected to the ceiling beam in such manner that the apparatus is prevented from moving in the lengthwise direction of the first groove in the ceiling beam.

The apparatus preferably further comprises a tilt prevention element which is designed in such a way that it is impossible to tilt the apparatus perpendicularly to the lengthwise extension of the of the first groove in the ceiling beam.

The sliding element and the tilt prevention element are particularly preferably connected to each other.

More preferably still, the sliding element and the tilt prevention element are arranged parallel to each other.

It is advantageous if the sliding element and the tilt prevention element are constructed as a single part.

According to a further preferred embodiment of the invention, the retaining element is aligned perpendicularly to the sliding element and the tilt prevention element.

It is also preferable if the retaining element, the sliding element and the tilt prevention element are constructed as a single part.

The locking element is preferably provided on the retaining element.

More preferably still, the locking element is constructed in such manner that it can be brought into engagement with a second groove in the ceiling beam.

It is also preferable if the locking element is constructed such that it can be brought into engagement with the second groove on the ceiling beam by a first rotating motion, and that is can be connected in force-fitting manner with the second groove in the ceiling beam by a subsequent, second rotating motion.

According to a still further preferred embodiment of the invention, the first rotating motion consists of a rotation through 90 degrees and the second rotating motion consists of a rotation through 180 degrees.

The sliding element is preferably disburdened of the weight force of the laboratory unit after the second rotation of the locking element.

It is also advantageous if the locking element includes a groove block and a swivel bracket connected rotatably thereto.

More preferably still, the apparatus comprises two locking elements, which are provided on opposite end sections of the retaining element.

The laboratory unit is preferably selected from the group consisting of a vertical service column, a horizontal lab media carrier, such as a service boom or a service wing, a suspended lab furniture unit and a light.

According to a second aspect of the invention, a system is provided which comprises at least one apparatus according to the first aspect of the invention and at least one ceiling beam which has at least one first groove that extends in the lengthwise direction of the ceiling beam.

The invention will now be described for exemplary purposes with reference to a preferred embodiment and the accompanying drawing.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the present invention.

DETAILED DESCRIPTION

Figure 1:
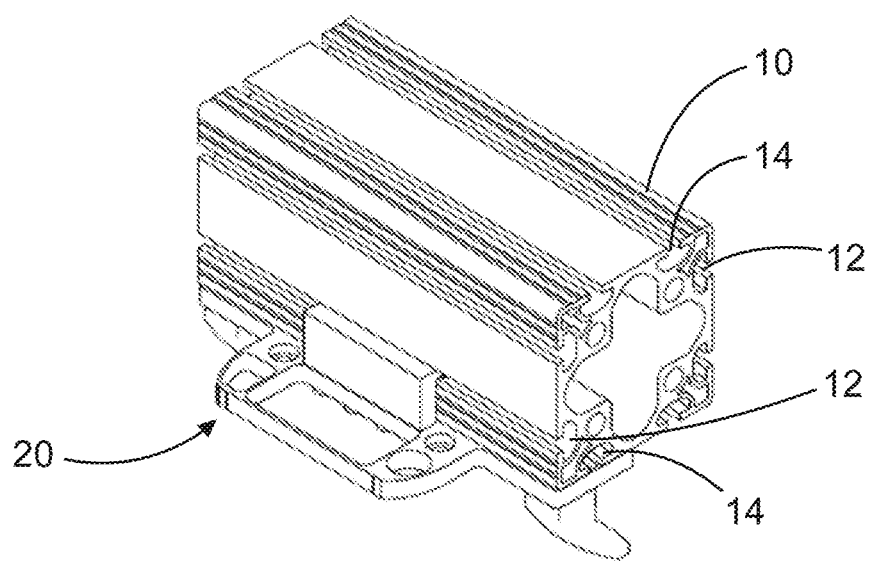
FIG. 1 shows a perspective view of a ceiling beam with apparatus fastened thereto according to a preferred embodiment of the invention.

FIG. 1 shows a perspective view of a beam 10 which is to be installed in the region of the laboratory ceiling, the beam being inherently rigid and extending horizontally. This beam may also be part of a service ceiling that already exists. The beam 10 is often made from extruded aluminium and has a hollow-chamber profile which comprises a multiplicity of grooves 12, 14 that extend in the lengthwise direction of the beam 10. The grooves 12, 14 are conventionally arranged point symmetrically with respect to each other in the area of the edges extending in the lengthwise direction of the beam 10. However differently constructed girders are also conceivable. It is only important that the beam has at least one groove 12 which extends in the lengthwise direction of the beam 10 and is sufficiently stable to support the weight force of a laboratory unit, which will be explained in greater detail later. The cross-section of the groove 12 may be of practically any design, providing the groove 12 guarantees that the component seated therein is displaceable and enables the drop protection which will be described in greater detail later.

According to the preferred embodiment shown in FIG. 1, the groove 12 has an access opening in the cross section which is perpendicular to the lengthwise extension thereof, and a bulge shaped like a mushroom head adjoining it which has a width and a maximum height in the region of the access opening. It is also conceivable for the bulge to be rectangular, with a height and width such that the cross section of the groove 12 is given the shape of a T (on its side).

Figure 2:
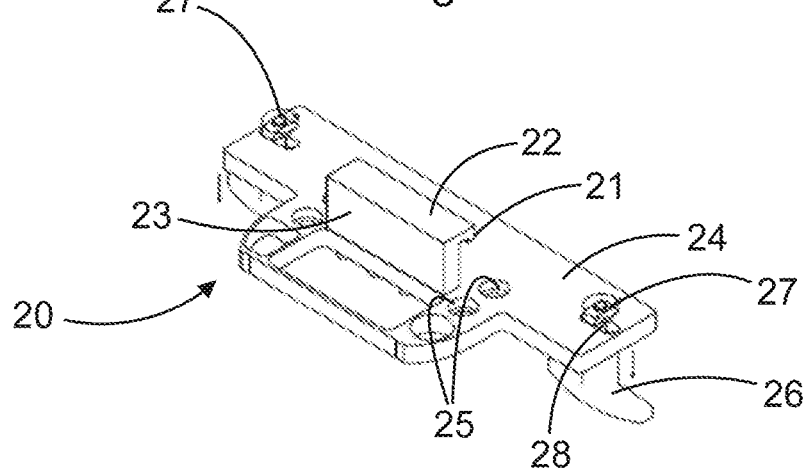
FIG. 2 shows the apparatus of FIG. 1 in the fastened state, but without the ceiling beam.

A preferred embodiment of the invention comprises an apparatus 20, which is represented in detail in FIG. 2. It should be noted here that FIG. 2 shows the apparatus 20 in a state in which it is secured to the beam 10.

Figure 3:
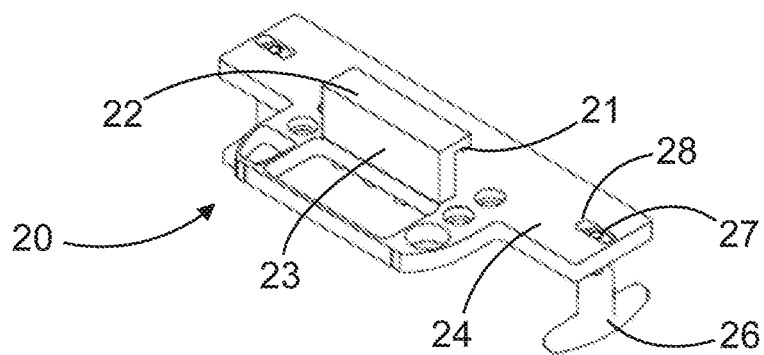
FIG. 3 shows the apparatus of FIG. 1 in the disassembled state.
Figure 4:
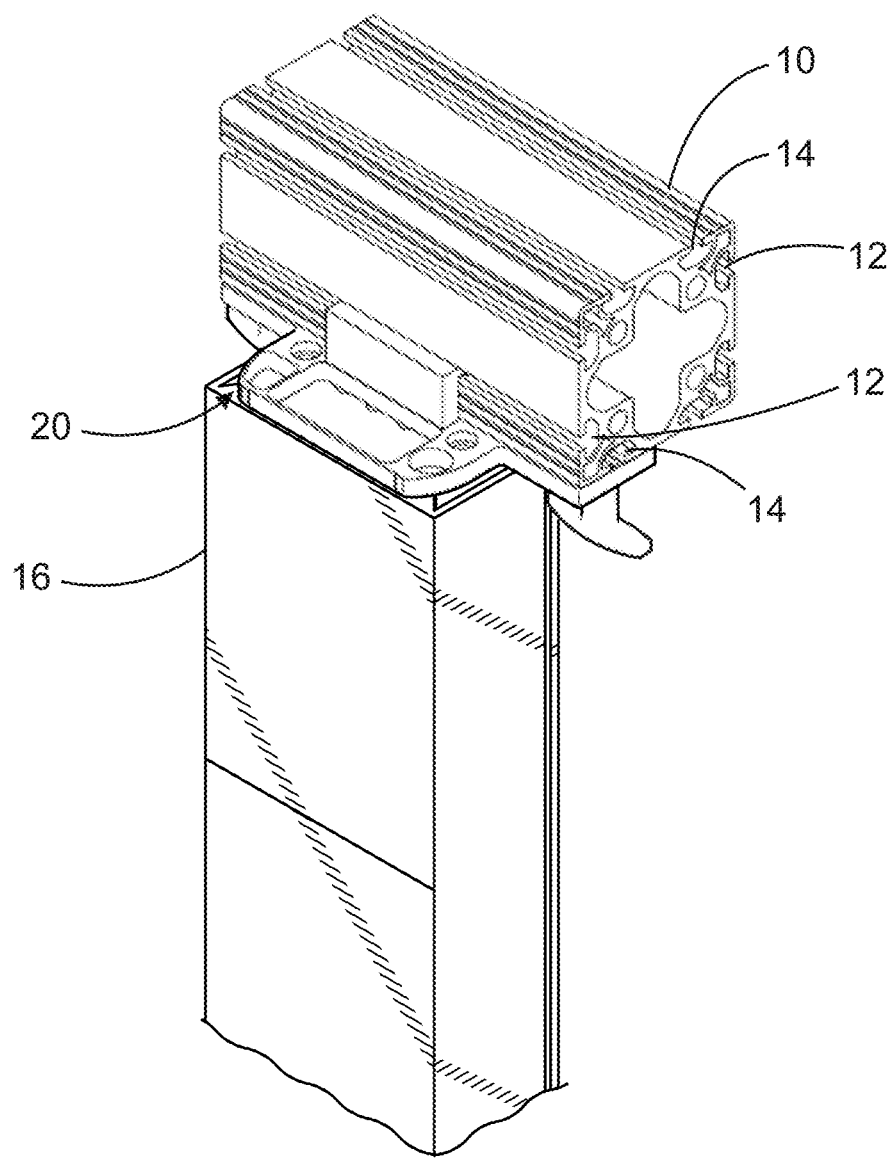
FIG. 4 schematically illustrates the apparatus of FIG. 1 with an exemplary laboratory unit coupled therewith.

The apparatus 20 serves primarily to fasten a laboratory unit, which is not shown in FIG. 1 to FIG. 3, displaceably to the beam 10. FIG. 4 schematically depicts an exemplary laboratory unit 16 coupled with apparatus 20. A laboratory unit 16 may be a service column, a horizontal lab media carrier, such as a service boom or a service wing, or it may also be a suspended item of laboratory furniture or a light fixture (light).

In order to fasten a laboratory unit 16, the apparatus 20 includes a multiplicity of assembly openings, or also assembly drillholes 25, which are arranged in such manner that a laboratory unit 16 can be fastened either directly to the apparatus 20 or indirectly to the apparatus 20 by interposing an assembly adapter or assembly plate (not shown). As shown in FIG. 2, the assembly openings or assembly drillholes 25 are provided on a retaining element 24 which in the assembled state preferably extends plane-parallel with the underside of the beam 10 (see FIG. 1). Only the part of the retaining elements 24 on which the assembly openings or assembly drillholes 25, or at least some of them, are located, extends in the lateral direction beyond the sides of the beam 10. In accordance with the embodiment shown in FIGS. 1 to 3, the retaining element 24 is of plate-like or planar construction.

According to the preferred embodiment of the invention shown in FIG. 1 to FIG. 3, the apparatus 20 further comprises a sliding element 21, a tilt prevention element 23 and a bridge element 22, which are preferably constructed as a single part with the retaining element 24. The sliding element 21 primarily serves the purpose of enabling the entire apparatus 20 to be displaced in sliding manner along the lengthwise extension of the groove 12 in beam 10. Additionally, the sliding element 21 supports the entire weight force of the laboratory unit 16 which is to be fastened to the apparatus 20.

When mounted on the beam 10, the tilt prevention element 23 of the apparatus 20 ensures that a laboratory unit 16 fastened to the apparatus 20 does not tilt sideways, i.e., laterally relative to the lengthwise extension of the beam 10. The tilt prevention element 23 and the sliding element 21 are preferably connected to each other via a bridge element 22. According to the preferred embodiment of the invention shown in FIG. 2, the sliding element 21 and the tilt prevention element 23 extend parallel to each other and are constructed as a single part. The sliding element 21 and the tilt prevention element 23 are preferably constructed as a single part with the retaining element 24. As is evident in FIG. 2, the bridge element 22 and the tilt prevention element 23 form an approximate L-shape in cross-section, i.e. perpendicularly to the lengthwise extension thereof, wherein a further short section (sliding element 21) is attached to the short leg of the L-shape (bridge element 22) and extends parallel to the long leg. In this context, the short section is shorter than the short leg.

A drop protection of the apparatus 20 consists in that the height of the sliding element 21, wherein the height extends perpendicularly to the lengthwise extension of the groove 12 on the beam 10, is substantially equivalent to the height of the access opening of the groove 12 on the beam, and to the extent that the sliding element 21 (preferably together with a section of the bridge element 22 which extends perpendicularly to the sliding element 21) is insertable through the access opening into the groove 12, and the width of the sliding element 21, viewed in the lateral direction to the lengthwise extension of the groove 12 on the beam 10, is substantially equivalent to the width of the bulge which adjoins the access opening in the groove 12. Preferred dimensions of the height of the sliding elements 21 lie in a range from 4 mm to 20 mm, more preferably 6 mm to 10 mm, and still more preferably the height is 8 mm. The width of the sliding element 21 preferably lies in a range from 4 mm to 20 mm, more preferably 6 mm to 10 mm, and still more preferably the height is 8 mm. The height and width of the sliding element 21 depends on the dimensions of the groove 12 and the weight force of the laboratory unit 16 which is to be attached to the apparatus 20.

When a force directed in the lateral direction of the lengthwise extension of the groove 12 acts on the apparatus 20, the structure of the sliding element 21, whose cross section is consistent with the shape of the groove 12 serves to prevent the apparatus 20 from falling or tilting out of the groove 12. Because in such a situation, not only the form-fitting seating of the sliding element 21 in the groove 12 but also the height of the sliding element 21, which is approximately the same as the height of the access opening of the groove 12, prevent the apparatus 20 from falling out of the groove 12.

In addition, at least one locking element 26, 27 (also called "quick lock") is provided, with whose aid the apparatus 20 may first be brought into engagement with the beam 10 and then connected in force-fitting manner thereto. The locking element 26, 27 preferably includes a rectangular groove block 27, which is connected rotatably and preferably with a spring mounting to a swivel bracket 26 via a shaft. Locking elements 26, 27 of such kind are preferably provided on both end sections of the retaining element 24.

According to the preferred embodiment of the invention shown in FIG. 1 to FIG. 3, the groove block 27 engages in a groove 14 provided on the underside of the beam 10. For this purpose, the groove block 27 must be aligned correspondingly with the groove 14, then introduced into the groove 14 and subsequently rotated preferably through 90 degrees with the aid of the swivel bracket. In this condition, the apparatus 20 is secured on the beam 10 to the extent that it cannot be disconnected from the beam 10 either on its own or inadvertently through the application of a force by the laboratory technician. In this condition, which is illustrated in FIG. 2, the apparatus 20 may be displaced along the groove 12 in the beam 10 so that the laboratory unit 16 which is fastened to the apparatus 20 can be moved to the intended location in the lab. Once the apparatus 20 and the laboratory unit 16 fastened thereto is positioned at the intended location, the swivel bracket 26 is rotated preferably through 180 degrees. With this rotation through 180 degrees, the groove block 27, is naturally connected in force-fitting manner to the beam 10 in cooperation with the retaining element 24.

At the same time, the act of rotating the swivel bracket 26 through 180 degrees the burden of the weight of the laboratory unit fastened to the apparatus 20 is removed from the sliding element 21. This is made possible by the fact that before the swivel bracket 26 is rotated the retaining element 24 is as a predetermined distance from the underside of the beam 10. Now if the swivel bracket is rotated through preferably 180 degrees and the retaining element 24 is pressed against the underside of the beam 10, the tilt prevention element 23, the bridge element 22 and the sliding element 21 simultaneously move upwards, causing the load to be removed from the sliding element 21. Only when the swivel bracket 26 is rotated, preferably through 180 degrees again in the opposite direction, thereby cancelling the force-fitting connection, is the entire apparatus 20 lowered, and the sliding element 21 with it, thus placing the sliding element 21 under load again.

As noted earlier, in order to be able to detach the apparatus 20 from the beam 10, the force fitting connection must be released by a rotation of the swivel bracket 26 preferably through 180 degrees A further rotation through preferably 90 degrees has the effect of lowering the groove block 27 so that it is seated preferably flush with the surface in the slot 28 provided in the retaining element 24. The seating of the groove block 27 in the slot 28 has the effect of moving the groove block 27 out of the groove 14 provided in the beam 10. This condition is illustrated in FIG. 3. The, the entire apparatus 20 can be taken down from the beam 10 by means of a lifting and pulling movement.

The apparatus 20 according to the invention makes it possible to fasten a laboratory unit 16 movably to a beam 10 which is already present in the laboratory without any need for tools. The fastening can be carried out without the need for technical personnel or other aids, such as a lifting apparatus, or even a drop protection, as is the case in the related art. The design of the sliding element 21 with a shape that matches the groove 12 in the beam 10, which in turn means that the height of the sliding element 21 is substantially equal to the height of the access opening in the groove 12, means that a drop protection is integrated in the apparatus 20, and the entire apparatus together with the laboratory unit attached thereto are secured against falling while they attached to the beam 10. In this way, the risk of accidents is reduced significantly. It is also advantageous that because of the drop protection is integrated it cannot be forgotten when the apparatus 20 and the laboratory unit are assembled. The sliding element 21 is only placed under load when the apparatus 20 and the laboratory unit fastened thereto are displaced. When the apparatus 20 is connected to the beam 10 in force-fitting manner, it is pushed upwards, thereby removing the load.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. An apparatus for movable fastening of a laboratory unit to a horizontally extending, elongated ceiling beam which is mounted in the region of a room ceiling, the ceiling beam having an upper surface, a lower surface, and at least one first groove extending in a lengthwise direction along a lateral side surface of the ceiling beam, the first groove having an outwardly-facing access opening extending in the lengthwise direction, the apparatus comprising:

a sliding element configured to be received laterally into the groove through the access opening for engagement with the first groove of the ceiling beam such that the apparatus is movable in the lengthwise direction of the first groove;
wherein a height of the sliding element is substantially equal to a height of the access opening to the first groove;
a retaining element cooperating with the sliding element and configured for releasable fastening of the laboratory unit; and
at least one locking element cooperating with the retaining element and configured for connection to the ceiling beam such that a movement of the apparatus in the lengthwise direction of the first groove is prevented.

2. The apparatus of claim 1, further comprising a tilt prevention element configured such that the apparatus is prevented from tilting perpendicularly to the lengthwise extension of the first groove.

3. The apparatus of claim 2, wherein the sliding element and the tilt prevention element are connected to each other.

4. The apparatus od claim 2, wherein the sliding element and the tilt prevention element are arranged parallel to each other.

5. The apparatus of claim 2, wherein the sliding element and the tilt prevention element are constructed as a single part.

6. The apparatus of claim 2, wherein the retaining element is arranged perpendicularly to the sliding element and the tilt prevention element.

7. The apparatus of claim 2, wherein the retaining element, the sliding element, and the tilt prevention element are constructed as a single part.

8. The apparatus of claim 1, wherein the locking element is provided on the retaining element.

9. The apparatus of claim 1, wherein the locking element is constructed such that it can be brought into engagement with a second groove on the ceiling beam.

10. The apparatus of claim 9, wherein the locking element is constructed such that it can be brought into engagement with the second groove on the ceiling beam by a first rotational motion, and can be coupled with the second groove on the ceiling beam in a force-fitting manner by a subsequent, second rotational motion.

11. The apparatus of claim 10, wherein the first rotational motion comprises a rotation through 90 degrees, and the second rotational motion comprises a rotation through 180 degrees.

12. The apparatus of claim 9, wherein the sliding element is disburdened of a weight force of the laboratory unit after the second rotational motion of the locking element.

13. The apparatus of claim 1, wherein the locking element comprises a groove block and a swivel bracket rotatably connected to the groove block.

14. The apparatus of claim 1, wherein the at least one locking element comprises two locking elements which are provided on opposite end sections of the retaining element.

15. The apparatus of claim 1, wherein the laboratory unit is selected from the group consisting of a vertical service column; a horizontal laboratory media carrier, such as a service boom or a service wing; a suspended item of lab furniture; and a light.

16. A system, comprising:
at least one ceiling beam which has at least one first groove extending in lengthwise direction of the ceiling beam; and
at least one apparatus according to claim 1.

17. The apparatus of claim 1, wherein the retaining element is configured for contacting the bottom surface of the ceiling beam.

* * * * *